Figure 3:
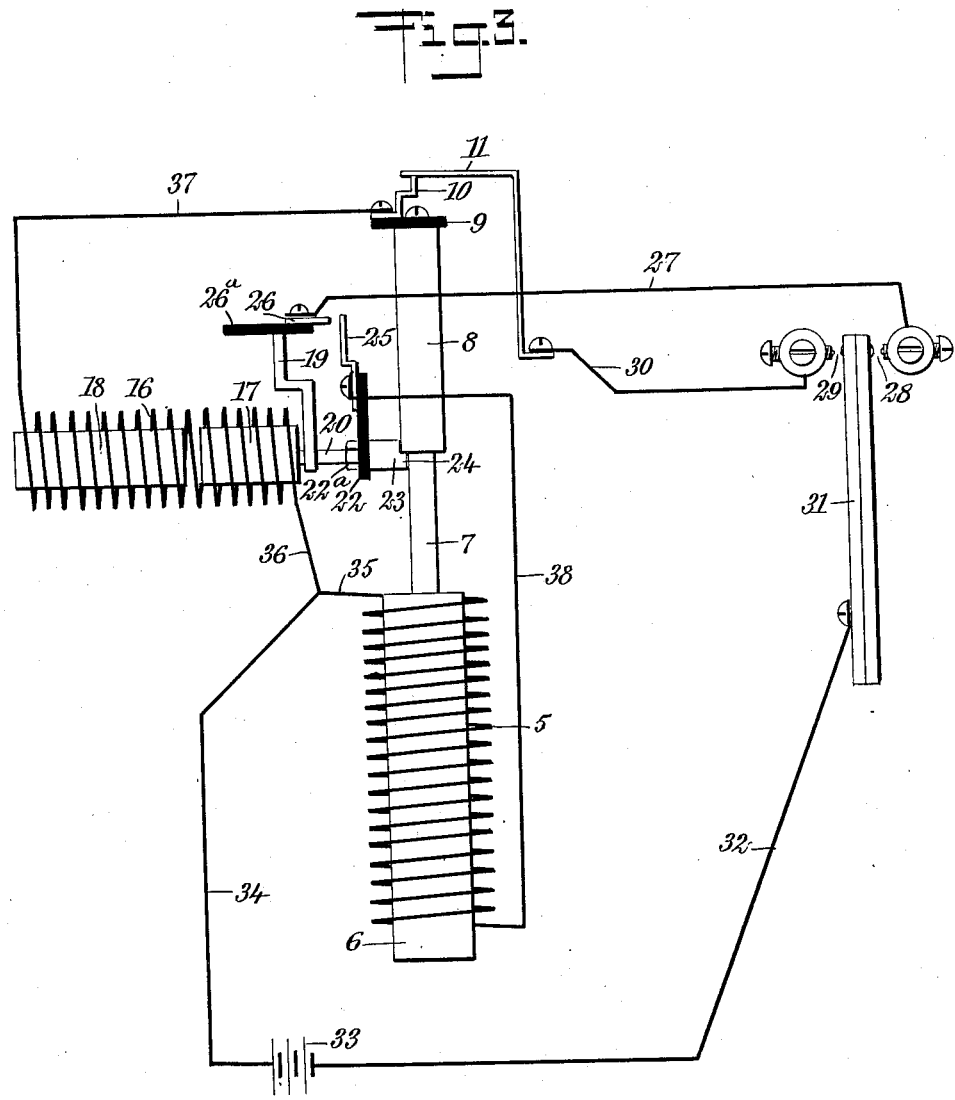

W. A. LACKE.
ELECTRICALLY OPERATED AUTOMATIC SWITCH.
APPLICATION FILED MAY 29, 1908.
936,329.
Patented Oct. 12, 1909.
2 SHEETS—SHEET 1.
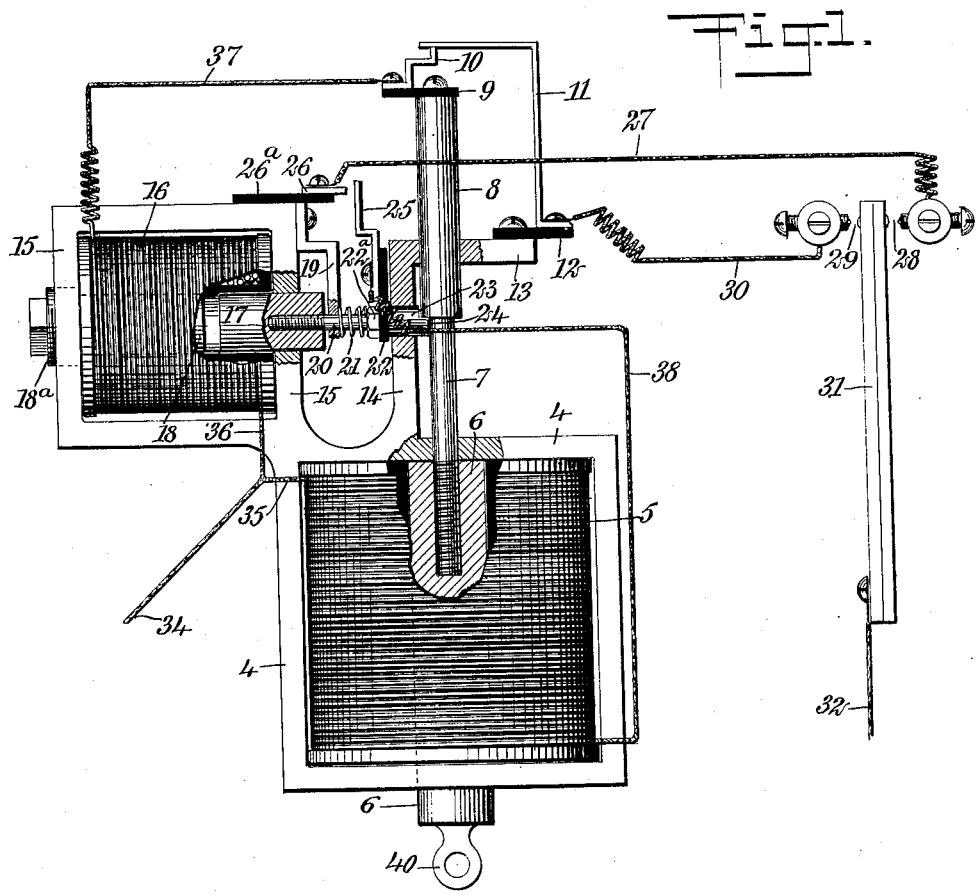
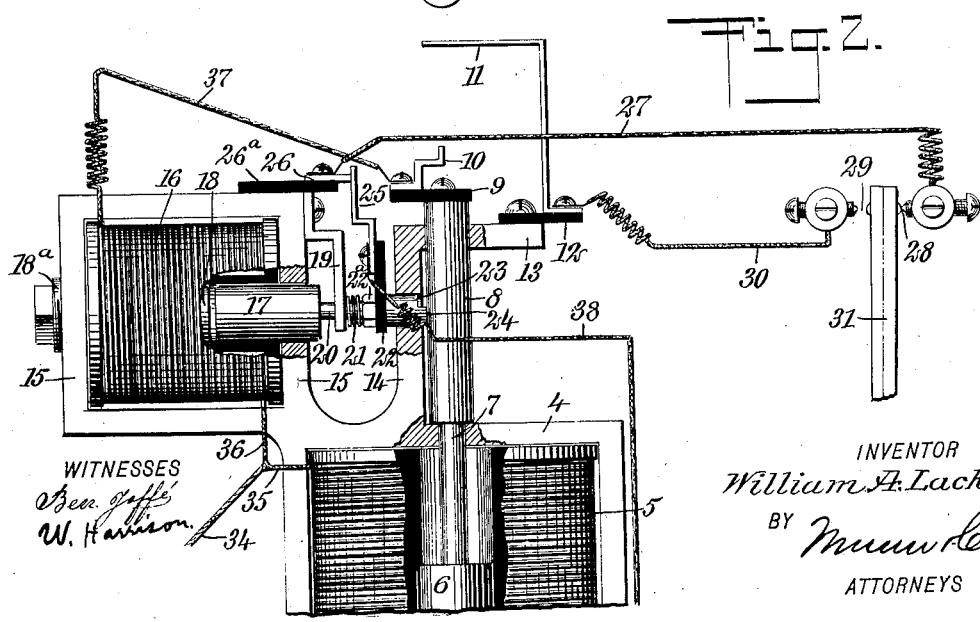
WITNESSES
INVENTOR
William A. Lacke
BY
ATTORNEYS W. A. LACKE.
ELECTRICALLY OPERATED AUTOMATIC SWITCH.
APPLICATION FILED MAY 29, 1908.

936,329.

Patented Oct. 12, 1909.
2 SHEETS—SHEET 2.

WITNESSES

INVENTOR
William A. Lacke
BY
ATTORNEYS

UNITED STATES PATENT OFFICE.

WILLIAM A. LACKE, OF CHICAGO, ILLINOIS.

ELECTRICALLY-OPERATED AUTOMATIC SWITCH.

936,329.

Specification of Letters Patent. Patented Oct. 12, 1909.

Application filed May 29, 1908. Serial No. 435,616.

*To all whom it may concern:*

Be it known that I, WILLIAM A. LACKE, a citizen of the United States, and a resident of Chicago, in the county of Cook and State of Illinois, have invented a new and Improved Electrically - Operated Automatic Switch, of which the following is a full, clear, and exact description.

My invention relates to electrically-operated automatic switches admitting of general use and possessing certain advantages of simplicity, reliability, cheapness of construction and economy in operation.

While for convenience I show but one form of the switch, it will be understood that it may be used in a great variety of relations more or less independent, and that I do not limit myself to the precise construction shown nor to the special use to which this particular device is applied.

The accompanying drawings show my invention as applied to a damper regulator; that is, to an apparatus in which a damper is opened, closed and locked in certain predetermined positions by the action of solenoids which are controllable by a thermostat having a contact for each solenoid, the thermostat thus being a type of electric switch.

One advantage of my device is the fact that the solenoids are dead at all times except when in the act of moving the damper in case a contact closes, and the damper regulating mechanism is in consequence actuated, the closure thereafter of the same contact will have no effect whatever and will not waste any current. It is only when another contact is closed and current is needed for moving the damper in the opposite direction that any current whatever is able to flow.

Reference is to be had to the accompanying drawings forming a part of this specification, in which similar characters of reference indicate corresponding parts in all the figures.

Figure 1 is a side elevation showing the automatic switch which is provided with a large solenoid having a vertically movable plunger for opening and closing the damper, the smaller solenoid having a horizontally movable plunger for locking and releasing the plunger of the first-mentioned solenoid, this view further showing various contacts which are opened and closed by the action of the solenoid plungers, and further showing a thermostat provided with separate contacts for controlling the two solenoids; the view indicating generally the position of the various parts when the damper is open; Fig. 2 is a fragmentary view somewhat similar to Fig. 1 but showing in its lowermost position the plunger of the larger solenoid, the various parts now occupying the respective positions which they occupy when the damper is closed; and Fig. 3 is a diagram of the solenoids, contacts and wiring, showing their relations to the thermostat and various other mechanical parts.

Mounted within a metallic frame 4 is a solenoid 5 which is provided with a movable core 6 of magnetic material, preferably iron, and projecting upwardly from this core is a stem 7 provided with a cylindrical head 8. Mounted upon this head is a plate 9 of insulating material, and carried by the latter is a bracket 10 of metal constituting a contact member. Another bracket 11 of metal, constituting another contact member, is mounted upon a plate 12 of insulating material, the latter being secured upon a shelf 13 carried by a standard 14 integral with it and with the frame 4.

A frame 15 is integrally connected with the frame 4 and supports a solenoid 16, the axis of this solenoid being horizontal. This solenoid is provided with a stationary armature 18 which is adjustable relatively to it by aid of a threaded portion 18$^a$. By turning the armature it is moved slightly along in the general direction of its axis. The solenoid 16 is further provided with a movable core 17 of magnetic material having its longest axis horizontal. This core 17 is drawn toward the stationary armature 18 by magnetic action whenever the solenoid 16 is energized. The stationary armature 18 is of iron and is employed for the purpose of increasing the magnetic attraction.

Mounted upon the frame 15 is a bracket 19 which serves as a bracket for supporting a stem 20. This stem extends directly through the bracket 19 and is secured firmly to the core 17. Encircling the stem 20 is a spiral spring 21. A plate 22 of insulating material is secured upon the stem 20 by aid of a nut 22$^a$. The stem 20 is provided with a head 23 having a step 24 integral with it. The plate 22 of insulating material is jammed against the head 23 by aid of the nut 22$^a$. A contact member 25 is carried by the plate 22 and is adapted to engage and disengage a contact member 26, the latter being secured upon a plate 26ª which is mounted upon the frame 15. The head 8 may rest upon the step 24, as indicated in Fig. 1, in which event the core 6 is sustained in its uppermost position. When, however, the solenoid 16, by its attraction for the core 17, causes the latter to move to the left according to Fig. 1, the step 24 is withdrawn from the head 8 and the core 6 therefore falls by its own weight. If, now, the solenoid 16 be deënergized, the step 24 presses against the head 8, as indicated in Fig. 2, because of the action of the spring 21. If, now, the core 6 be again raised, the step 24 slips under the head 8, thus sustaining the core 6 even after the solenoid 5 is deënergized. The contact member 26 is connected by a wire 27 with a contact 28. Another contact 29 is connected by a wire 30 with the contact member 11.

A thermostatic bar is shown at 31 and opens and closes the contacts 28, 29. From the thermostatic bar a wire 32 leads to a battery 33 and connected with the latter is a wire 34 which is connected to two wires 35, 36, making a so-called Y-connection therewith. The wire 35 leads to the large solenoid 5 and the wire 36 leads to the smaller solenoid 16, and from the latter a wire 37 leads to the contact member 10. A wire 38 is connected with the solenoid 5 and also with the contact member 25. The solenoid 6 is provided with an eye 40 to facilitate its connection with a damper.

The operation of my device is as follows: I will assume that the switch is to be applied to a damper, and that with the parts in the position indicated in Figs. 1 and 3 (the core 6 being in its uppermost position) the damper is opened. Now, it is obvious that as the core 6 is already in its uppermost position there is no need of wasting current by allowing it to pass through the solenoid 5 until the core 6 is lowered. In my arrangement the thermostatic bar 31, by moving to the right, closes the contact 28, but this movement is unable to waste any current or to energize either solenoid for the reason that the circuit is opened between the contact members 25, 26. No matter, therefore, how many times the thermostatic bar 31 may move to the right, no other part of the apparatus is affected in any manner. Suppose, however, that the thermostatic bar moves to the left to a sufficient distance to close the contact 29. The following circuit is thereby completed: battery 33, wire 32, thermostatic bar 31, contact 29, wire 30, contact members 11, 10, wire 37, solenoid 16, wires 36, 34, back to battery 33. This energizes the solenoid 16 and causes the core 17 to move to the left, thereby withdrawing the step 24 from the head 8. This allows the core 6 to drop by its own weight, carrying with it, of course, the stem 7, head 8, plate 9 and contact member 10, and breaking contact between the contact members 10 and 11. The downward movement of the core 6 closes the damper and presumably changes the temperature of the thermostatic bar 31. If, now, it should happen through any cause that the thermostatic bar 31 should close the contact 29, this movement can not in any wise affect any part of the apparatus, owing to the fact that the contact member 10 has disengaged the contact member 11, as will be understood from Fig. 2. No matter, therefore, how often the contact 29 may be closed, nothing can take place to disturb the apparatus until the thermostatic bar 31 moves to the right a distance sufficient to close the contact 28. Meanwhile (the parts being in the position indicated in Fig. 2), the head 23 is held in its extreme position to the left, although the solenoid 16 is no longer energized. The bulk of the head 8 accomplishes this purpose as it keeps the spring 21 compressed, and in doing this it maintains the contact member 25 in engagement with the contact member 26. Suppose, now, that the thermostatic bar 31 moves to the right so as to close the contact 28, as indicated in Fig. 2. The instant this takes place, the following circuit is completed: battery 33, wire 32, bar 31, contact 28, wire 27, contact members 26, 25 (now closed—see Fig. 2), wire 38, solenoid 5, wires 35, 34, back to battery 33. This energizes the solenoid 5 and lifts the core 6 so that, owing to the action of the spring 21, the step 24 slips under the cylindrical head 8 and maintains the core 6 in its uppermost position, as indicated in Fig. 1. This leaves the apparatus in its original position. The net result of the action of the device is that the core 6 moves alternately into its uppermost and its lowermost positions, and maintains either position until a substantial change is made in the position of the thermostatic bar 31. It will also be noted that the solenoids 5, 16 are nearly always dead. The mere closing of either contact 28 or 29 does not energize either of the solenoids for the reason that it may happen that the circuit is open elsewhere than at the contact thus closed. Not only, therefore, does the apparatus prevent waste of battery power, but it also prevents undesirable action of the movable parts.

I find that the device is especially useful in connection with such mechanism as damper regulators, air compressor regulators, water level regulators, and semaphore arms. It may, in fact, be used in any relation where the closure of different contacts is relied upon to move a member in opposite directions. Among its general advantages are the following: I, no energy is consumed in holding either plunger at either end of its travel; II, there is no current to be broken at the connecting points of the controlling switch, this being a decided advantage in connection with the thermostatic bar or in any relation where the contacts may be opened very slowly; III, the solenoids being cut off entirely after the core has completed its travel in either direction renders the device capable of use with almost any kind of current whether direct or alternating; IV, there will be very little heat to dissipate because the current is cut off immediately after the solenoid cores complete their respective travels.

While I preferably use solenoids because they give a longer stroke to the cores, any equivalent magnetic members may be employed. For convenience I designate the solenoid 5 as a motor solenoid and the solenoid 16 as a locking solenoid.

Having thus described my invention, I claim as new and desire to secure by Letters Patent:

The combination of a movable member, a head for temporarily supporting the same, magnetic mechanism for displacing said head so as to release said movable member, a contact normally open and adapted to be closed by said magnetic mechanism, an electric switch provided with a plurality of contacts, one of said contacts being in electrical communication with said first-mentioned contact, another contact controllable by said movable member and normally closed but adapted to be opened whenever said movable member is released, and an electrical connection from said last-mentioned contact to one of the contacts of said electric switch.

In testimony whereof I have signed my name to this specification in the presence of two subscribing witnesses.

WILLIAM A. LACKE.

Witnesses:
JOHN P. GEHRING,
F. E. SINKHAM.